United States Patent [19]
Haage et al.

[11] 3,992,842
[45] Nov. 23, 1976

[54] ROOF CONSTRUCTION OF A PLURALITY OF THERMOPLASTIC COMPOSITE SHEETS WITH INORGANIC FLAMEPROOFING LAYER

[75] Inventors: Karl Haage, Troisdorf-Spich; Dieter Scharff, Troisdorf-Sieglar, both of Germany

[73] Assignee: Dynamit Nobel Aktiengesellschaft, Germany

[22] Filed: Oct. 3, 1974

[21] Appl. No.: 511,675

[30] Foreign Application Priority Data
Oct. 3, 1973   Germany............................ 2349666

[52] U.S. Cl.................................. 52/309; 428/192; 428/251; 428/285; 428/500; 428/441; 428/442; 428/443; 428/282; 428/921; 52/622
[51] Int. Cl.² ...................... E04C 1/00; B32B 3/02
[58] Field of Search .......... 161/403, 145, 203, 205, 161/247; 428/921, 190, 192, 251, 285, 441, 442, 443, 282, 500; 52/622, 309

[56] References Cited
UNITED STATES PATENTS

| 3,026,225 | 3/1962 | Ostby, Jr......................... | 428/190 X |
| 3,466,222 | 9/1969 | Curtis ............................. | 428/921 X |
| 3,493,460 | 2/1970 | Windecker..................... | 161/403 X |
| 3,503,841 | 3/1970 | Sterrett........................... | 428/443 X |
| 3,509,008 | 4/1970 | Adomshick et al............ | 161/403 X |
| 3,543,460 | 12/1970 | Stastny et al. ................ | 161/403 X |
| 3,770,569 | 11/1973 | Breiner........................... | 428/443 X |

*Primary Examiner*—P. C. Ives
*Attorney, Agent, or Firm*—Craig & Antonelli

[57] ABSTRACT

A synthetic resin composite sheet is made of a synthetic resin such as soft PVC, for sealing non-graveled, single-shell roofs or the like, and is provided with a flameproofing layer. The flameproofing layer is embedded within the synthetic resin.

17 Claims, 2 Drawing Figures

ROOF CONSTRUCTION OF A PLURALITY OF THERMOPLASTIC COMPOSITE SHEETS WITH INORGANIC FLAMEPROOFING LAYER

The present invention relates to a synthetic resin composite sheet, made, for example, of soft PVC, preferably for sealing non-graveled, single-shell roofs or the like, with a flameproofing layer.

When sealing non-graveled, single-shell roofs, known as heat-insulated roofs, it is necessary to meet the requirements of resistance against flying sparks and radiant heat. With the use of synthetic resin sheets, for example, soft PVC sheets, it is known to install, as flameproofing layers between the thermal-insulating material lying on the topside of the roof and the roofing skin disposed thereabove for sealing purposes, layers of asbestos board, for example. This, however, requires an additional working step at the building site for the spreading and aligning of the flameproofing layer which must additionally be weighted, i.e. held down in case of strong winds.

It is a purpose of the present invention to simplify the sealing of areas by means of synthetic resin sheets wherein a flameproofing layer is required. According to the invention, a synthetic resin composite sheet is proposed which is characterized in that the flameproofing layer is embedded in a synthetic resin sheet or layer. The composite panel of synthetic resin sheet and flameproofing layer, according to this invention, saves a working step during the installation of the roof. Moreover, the thus-incorporated flameproofing layer has the effect that the resistance of the synthetic resin composite sheet against mechanical damage is increased, which can be still further enhanced by a suitable selection of the mat of flameproofing material utilized for the sheet.

It is advantageous to surround the flameproofing layer on all sides by the synthetic resin sheet, wherein the flameproofing layer terminates at a certain distance from the lateral edges of the synthetic resin sheet within the latter. In this manner, a strip without an insert is created in the marginal zone of the synthetic resin sheet, constituting a tightly closed (sealed) edge area.

The flameproofing layer can consist of an inorganic non-woven mat or felt, for example, glass fiber mat or asbestos board. Depending on the chosen material for the flameproofing layer, it is not only possible to ensure resistance against flying sparks and radiant heat, but simultaneously to obtain an increased impact strength.

To avoid an incorrect installation over the surface to be covered in case of a non-uniform configuration of the cross section of the composite synthetic resin sheet provided with the flameproofing layer, a further feature of this invention resides in coloring the topside and the underside of the composite synthetic resin sheet with different colors. Color pigments used to color the synthetic resin sheets may consist of any commercially available pigment such as titanium dioxide, "coloring" black, cadmium yellow, cadmium red, lead chromate, phthalocyanine, etc. The quantity of coloring pigment which is added is very small, and is preferably less than 1% by weight relative to the quantity of thermoplastic resin. It is also possible to differentiate between the topside and the underside of the synthetic resin sheet by different profiling or other marking methods.

If the layered synthetic resin sheet is severed, for example, if partial sections are cut off therefrom, the open, severed edges are secured (sealed), for example, by means of a liquid film or by cover strips.

Two embodiments of the invention are illustrated in the accompanying drawing and will be further understood from the following detailed description with reference to the accompanying drawing; wherein.

Figure 1:
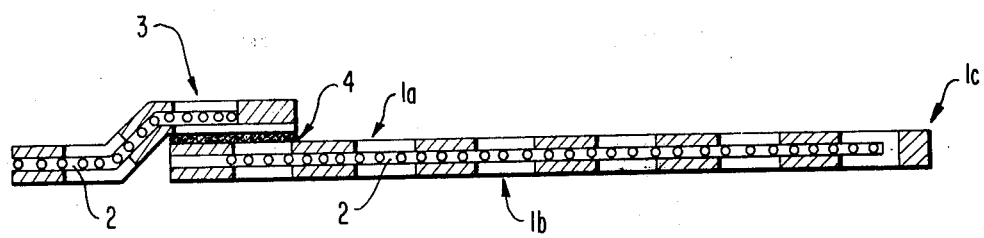
FIG. 1 is a cross-sectional view of a composite sheet of the invention.

The synthetic resin composite sheet has between the upper thermoplastic cover layer or sheet 1a and the lower thermoplastic cover layer cr sheet 1b, the flameproofing layer 2 which is surrounded on all sides by the synthetic resin portion of the composite sheet. The marginal zone 1c of the synthetic resin composite sheet is devoid of the flameproofing layer 2, which has the advantage, for example, that the seam connection between the upper cover layer 1a and the lower cover layer 1b in the marginal zone can be established more readily and more satisfactorily. The most suitable materials for the flameproofing layer are tissues, mats, or fleeces consisting of inorganic mineral fibers such as fiberglass and asbestos fibers, under certain circumstances, fire-resistive filler materials are included in the flameproofing layer. The joining of two abutting composite sheets of synthetic resin is accomplished, for example, as shown herein, by means of the overlapping seam 3, where the sheets are joined in the junction area 4, for example, by means of solution welding, e.g. by use of a solvent such as tetrahydrofurane. However, it is just as readily possible to employ a hot-air welding step, or also a gluing operation, depending on the respectively used material for the synthetic resin sheet 5 of the composite sheet construction. Suitable sealing sheets are especially thermoplastic synthetic resin sheets made of, for example, polyvinyl chloride, polyvinylidene chloride, polyisobutylene, nitrile rubber, synthetic rubber, etc.

The synthetic resin composite sheet with an incorporated flameproofing layer according to this invention can be manufactured, for example, by extrusion, wherein the flameproofing layer is enveloped on all sides by the layers of thermoplastic synthetic resin. Another possibility for producing the composite sheet resides in stacking the lower cover layer, the flameproofing layer, and the upper cover layer on top of each other and then welding or gluing or solution-welding the edges of the upper and lower cover layers together. In this connection, it is also possible to select a different material for the upper cover layer than for the lower cover layer, and/or to make the cover layers of different thicknesses. The latter also holds true for multiple-layer synthetic resin composite sheets manufactured by continuous extrusion. In certain cases, it is advantageous to employ a particularly rugged thermoplastic material for the cover layer on the topside. A further possibility for producing the synthetic resin composite sheet with the flameproofing layer consists in combining the synthetic resin sheets, while still in the thermoelastic condition, with the flameproofing layer under pressure, whereby a good adhesion of the layers to one another is attained. Moreover, the synthetic resin layers can also be joined to the flameproofing layer by the spreading method with pasty, gellable synthetic resin compositions.

Figure 2:
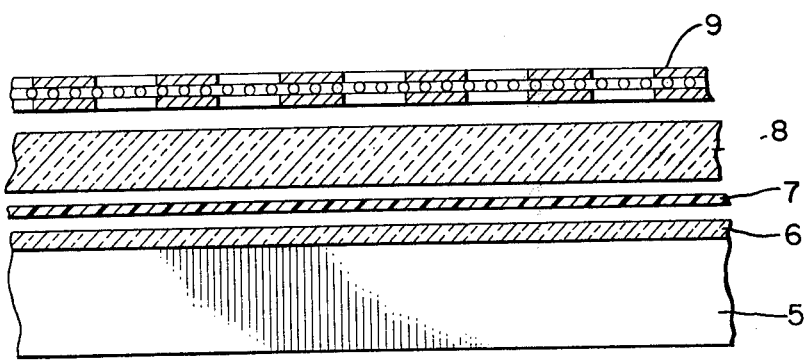
FIG. 2 is a cross-sectional view of a roof construction employing the composite sheet.

FIG. 2 shows the structure of a single sheet insulated roof without any gravel. Reference numeral 5 designates the substructure of the roof, for example a trapezoidal plate, and 6 is a separating layer consisting of rough felt paper, rough glass fleece, chipboard or the like. A moisture barrier 7, for example a sheet of soft PVC, 0.8mm thickness, is provided and reference numeral 8 designates heat insulating sheets, for example polyurethane foam sheets, and 9 designates the composite sheet or roof covering layer of the invention having incorporated therein a flameproofing layer.

While the novel embodiments of the invention have been described, it will be understood that various omissions, modifications and changes in these embodiments may be made by one skilled in the art without departing from the spirit and scope of the invention.

What is claimed is:

1. A thermoplastic synthetic resin composite sheet for sealing non-graveled, single-shell roofs or the like, with an inorganic flameproofing layer, which comprises two layers of thermoplastic synthetic resin having a separate inorganic flameproofing layer embedded therebetween, said layers of thermoplastic synthetic resin having lateral edges that are joined together to envelop the flameproofing layer.

2. The composite sheet of claim 1, wherein the flameproofing layer is an asbestos material which is embedded in one side of a polyvinyl chloride sheet forming one layer of thermoplastic synthetic resin, said asbestos material also being embedded within another layer of thermoplastic synthetic resin on the side opposite to that which is embedded in the polyvinyl chloride sheet.

3. The composite sheet of claim 1, wherein the flameproofing layer is surrounded on all sides by at least one layer of the synthetic resin.

4. The composite sheet of claim 3, wherein an upper layer of the synthetic resin is on one side of the flameproofing layer and a lower layer of the synthetic resin is on the other side of said flameproofing layer, the flameproofing layer terminating at a distance from the lateral edges of the upper and lower layers forming the synthetic resin composite sheet and the lateral edges being joined together to provide a lateral seam connection between said upper and lower layers.

5. The composite sheet of claim 1, wherein the flameproofing layer is a non-woven mat or felt of inorganic synthetic material.

6. The composite sheet of claim 1, wherein the inorganic synthetic material is glass fiber.

7. The composite sheet of claim 1, wherein asbestos board is utilized as the flameproofing layer.

8. The composite sheet of claim 3, wherein the topside and underside layers of thermoplastic synthetic resin surrounding the flameproofing layer have different thicknesses which are sufficient to distinguish the topside from the underside of the composite sheet.

9. The composite sheet of claim 3, wherein the topside layers of the thermoplastic synthetic resin have one color and the underside layers of the thermoplastic synthetic resin have another color.

10. A roof construction comprising a plurality of the composite sheets of claim 1, positioned on a layer of thermal insulating material within a single-shell roof, the lateral edges of said plurality of sheets being joined together to form a seal over said thermal insulating material.

11. The composite sheet of claim 1, wherein said thermoplastic synthetic resin is selected from the group consisting of polyvinyl chloride, polyvinylidene chloride, polyisobutylene, nitrile rubber, and synthetic rubber and the flameproofing layer is a material selected from the group consisting of asbestos and fiberglass.

12. The roof construction of claim 10, wherein said thermoplastic synthetic resin forming an upper layer provides a sealing skin for said roof construction, and said flameproofing layer provides resistance against flying sparks and radiant heat to said roof construction.

13. A thermoplastic synthetic resin composite sheet having a flameproofing insert layer and being capable of sealing roof constructions or the like, which consists of at least one upper layer of a thermoplastic synthetic resin, an insert comprising an inorganic flameproofing layer and at least one lower layer of a thermoplastic synthetic resin, the lateral edges of said at least one upper layer being sealed to the lateral edges of the at least one lower layer and the insert being surrounded by the upper and lower layers and the sealed lateral edges thereof.

14. The composite sheet of claim 13, wherein the thermoplastic synthetic resin is selected from the group consisting of polyvinyl chloride, polyvinylidene chloride, polyisobutylene, nitrile rubber, and synthetic rubber and the flameproofing layer is a material selected from the group consisting of asbestos and fiberglass.

15. The roof construction of claim 10, wherein the lateral edges of said plurality of sheets are overlapped sufficiently to allow the inorganic flameproofing layer in each sheet to be positioned immediately adjacent to the inorganic flameproofing layer in an adjacent composite sheet whereby a continuous flameproofing layer is provided for said roof construction.

16. The roof construction of claim 15, wherein said composite sheets are overlapped so that the inorganic flameproofing layers are placed superjacent to each other and are separated from each other by a junction zone provided by a lower layer of thermoplastic synthetic resin of one sheet and an upper layer of thermoplastic synthetic resin of another sheet.

17. A composite sheet construction comprising a plurality of the composite sheets of claim 1, the lateral edges of said plurality of sheets being joined together.

* * * * *